United States Patent
Ueda (10) Patent No.: US 10,641,659 B2
(45) Date of Patent: May 5, 2020

(54) INFRARED MICROSCOPE WITH ADJUSTABLE CONNECTION OPTICAL SYSTEM

(71) Applicant: SHIMADZU CORPORATION, Kyoto-shi, Kyoto (JP)

(72) Inventor: Atsushi Ueda, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 16/103,238

(22) Filed: Aug. 14, 2018

(65) Prior Publication Data

US 2020/0056942 A1 Feb. 20, 2020

(51) Int. Cl.
| | |
|---|---|
| *G01J 3/02* | (2006.01) |
| *G01J 3/453* | (2006.01) |
| *G02B 21/00* | (2006.01) |
| *G01J 3/28* | (2006.01) |
| *G01N 21/35* | (2014.01) |

(52) U.S. Cl.
CPC ........... *G01J 3/453* (2013.01); *G01J 3/0289* (2013.01); *G01J 3/2889* (2013.01); *G02B 21/0096* (2013.01); *G01N 2021/3595* (2013.01)

(58) Field of Classification Search
CPC ........ G01J 3/453; G01J 3/0289; G01J 3/2889; G02B 21/0096; G01N 2021/3595
See application file for complete search history.

(56) References Cited

U.S. PATENT DOCUMENTS

| 3,705,755 A | * | 12/1972 | Baer | G02B 21/0048 250/236 |
| 4,473,295 A | * | 9/1984 | Doyle | G01N 21/474 356/244 |
| 5,153,675 A | * | 10/1992 | Beauchaine | G01J 3/453 250/339.08 |

(Continued)

FOREIGN PATENT DOCUMENTS

| EP | 3260902 A4 * | 2/2018 | ............ G02B 21/06 |
| JP | 6160727 A | 6/1994 | |

(Continued)

OTHER PUBLICATIONS

Communication dated Mar. 26, 2019, from the Japanese Patent Office in counterpart application No. 2016-035867.

*Primary Examiner* — David P Porta
*Assistant Examiner* — Djura Malevic
(74) *Attorney, Agent, or Firm* — Sughrue Mion, PLLC (57) ABSTRACT

An infrared microscope includes an illumination optical system which guides infrared red to an analysis position on a sample; a connection optical system which guides infrared light, supplied from an infrared spectrophotometer, to said illumination optical system; a visible light source unit which outputs visible light to a region including said analysis position on the sample; an image acquisition unit which inputs visible light from the region including said analysis position on the sample to a detection surface and acquires a visible light image; and a detection unit which detects infrared light from said analysis position on the sample. The connection optical system can be positionally adjusted, and said image acquisition unit is capable of acquiring an infrared light image by inputting infrared light to a detection surface.

7 Claims, 6 Drawing Sheets

(56) References Cited

U.S. PATENT DOCUMENTS

| | | | | |
|---|---|---|---|---|
| 5,192,980 A * | 3/1993 | Dixon | G01J 3/30 | 250/458.1 |
| 5,317,378 A * | 5/1994 | Mould | G01N 21/03 | 356/236 |
| 5,377,003 A * | 12/1994 | Lewis | G01J 3/2823 | 250/339.02 |
| 5,495,334 A * | 2/1996 | Nagoshi | G01J 3/4532 | 356/456 |
| 5,528,368 A * | 6/1996 | Lewis | G01J 3/2823 | 250/339.02 |
| 5,793,042 A * | 8/1998 | Quick | G01J 3/453 | 250/339.07 |
| RE36,529 E * | 1/2000 | Lewis | G01J 3/2823 | 250/339.02 |
| 6,141,100 A * | 10/2000 | Burka | G01J 3/2823 | 250/339.11 |
| 7,224,460 B2 * | 5/2007 | Soga | G01N 21/55 | 356/444 |
| 7,560,697 B2 * | 7/2009 | Hoult | G01J 3/2803 | 250/349 |
| 7,869,039 B2 * | 1/2011 | Akao | G01J 3/02 | 356/368 |
| 9,402,059 B2 * | 7/2016 | Maji | G02B 21/088 | |
| 9,459,150 B2 * | 10/2016 | Fukuda | G01J 3/0264 | |
| 9,625,695 B2 * | 4/2017 | Sun | G02B 21/025 | |
| 2002/0033452 A1 * | 3/2002 | Hoult | G01J 3/2803 | 250/332 |
| 2002/0041439 A1 * | 4/2002 | Engelhardt | G02B 21/002 | 359/368 |
| 2002/0056807 A1 * | 5/2002 | Narita | B82Y 20/00 | 250/234 |
| 2002/0164810 A1 * | 11/2002 | Dukor | G01N 33/57415 | 436/64 |
| 2003/0103209 A1 * | 6/2003 | Simon | G01J 3/2823 | 356/456 |
| 2004/0019269 A1 * | 1/2004 | Schaefer | A01J 5/0138 | 600/407 |
| 2004/0145804 A1 * | 7/2004 | Engel | G01B 9/04 | 359/368 |
| 2004/0233423 A1 * | 11/2004 | Nakayama | G01N 21/0303 | 356/246 |
| 2005/0248837 A1 * | 11/2005 | Sase | G02B 21/002 | 359/380 |
| 2006/0119856 A1 * | 6/2006 | Koshoubu | G01J 3/2889 | 356/451 |
| 2006/0164633 A1 * | 7/2006 | Koshoubu | G01J 3/02 | 356/300 |
| 2006/0202124 A1 * | 9/2006 | Hoult | G01J 3/2803 | 250/349 |
| 2008/0282197 A1 * | 11/2008 | Yumoto | G02B 21/365 | 715/838 |
| 2009/0103173 A1 * | 4/2009 | Akao | G01J 3/02 | 359/368 |
| 2009/0231422 A1 * | 9/2009 | Fukuyama | G02B 21/24 | 348/79 |
| 2011/0255745 A1 * | 10/2011 | Hodder | G01N 21/359 | 382/103 |
| 2012/0044340 A1 * | 2/2012 | Yamamoto | G02B 21/14 | 348/79 |
| 2012/0306998 A1 * | 12/2012 | Merrill, II | G02B 21/0004 | 348/36 |
| 2013/0003060 A1 * | 1/2013 | Kimura | G01J 3/08 | 356/319 |
| 2013/0242078 A1 * | 9/2013 | Maji | G02B 21/088 | 348/79 |
| 2014/0253714 A1 * | 9/2014 | Weida | G02B 21/0056 | 348/80 |
| 2014/0362204 A1 * | 12/2014 | Watanabe | G02B 21/365 | 348/79 |
| 2016/0003676 A1 * | 1/2016 | Fukuda | G01J 3/0264 | 250/339.08 |
| 2017/0212041 A1 * | 7/2017 | Vuiblet | G01N 21/3563 | |
| 2017/0227942 A1 * | 8/2017 | Thomson | G01B 11/24 | |
| 2018/0024344 A1 * | 1/2018 | Ueda | G02B 21/06 | 359/363 |
| 2018/0119782 A1 * | 5/2018 | Maji | F16H 25/2003 | |
| 2018/0120552 A1 * | 5/2018 | Maji | G02B 21/362 | |
| 2019/0187452 A1 * | 6/2019 | Nakata | G02B 21/26 | |

FOREIGN PATENT DOCUMENTS

| | | | |
|---|---|---|---|
| JP | 06174637 A | * | 6/1994 |
| JP | 11242164 A | | 9/1999 |
| JP | 2000-121554 A | | 4/2000 |
| JP | 2001174708 A | * | 6/2001 |
| JP | 3125124 U | | 9/2006 |
| JP | 2007264322 A | * | 10/2007 |
| JP | 2009-139352 A | | 6/2009 |
| JP | 2012117936 A | | 6/2012 |
| JP | 2013109205 A | | 6/2013 |

* cited by examiner

INFRARED MICROSCOPE WITH ADJUSTABLE CONNECTION OPTICAL SYSTEM

TECHNICAL FIELD

The present invention relates to an infrared microscope and an infrared microscope system used in combination with an infrared spectrophotometer.

BACKGROUND ART

Fourier transform infrared spectrophotometers (hereinafter abbreviated as "FTIR") may be combined with an infrared microscope for performing micro-spectrophotometry in the infrared wavelength region. In such cases, a connection optical system is arranged between the FTIR and the infrared microscope main body, and the angle of the plane mirrors of the connection optical system is adjusted to properly align the optical axis of the infrared light beam from the FTIR and the optical axis of the infrared light introduction unit (optical system) of the infrared microscope main body.

The infrared microscope to which an infrared light beam has been supplied from the FTIR via the connection optical system irradiates that infrared light beam onto a specific small area (for example, a 15 μm×15 μm analysis position) on the surface of a sample. Based on functional groups of organic substances or the like, a spectrum specific to a molecular structure, etc. is generated from the specific small area on the sample surface, so identification and quantitation of organic substances and the like are performed by detecting and analyzing this spectrum (for example, see patent document 1).

Furthermore, the infrared microscope comprises an image acquisition unit such as a CCD camera or CMOS camera for observation of the sample surface by an analyst, and determination of analysis position on the sample surface and the like is performed while observing a visible light image of the sample surface using this image acquisition unit. For example, visible light from a light source such as a halogen lamp is irradiated onto a region including the analysis position on the sample surface, and visible light reflected by the region including the analysis position on the sample surface is detected with a CMOS camera, as a result of which, a visible light image based on the detected visible light is displayed. Based on this, the analyst designates the infrared light beam irradiation position on the sample or designates the analysis range on the sample while looking at the visible light image.

Figure 4:
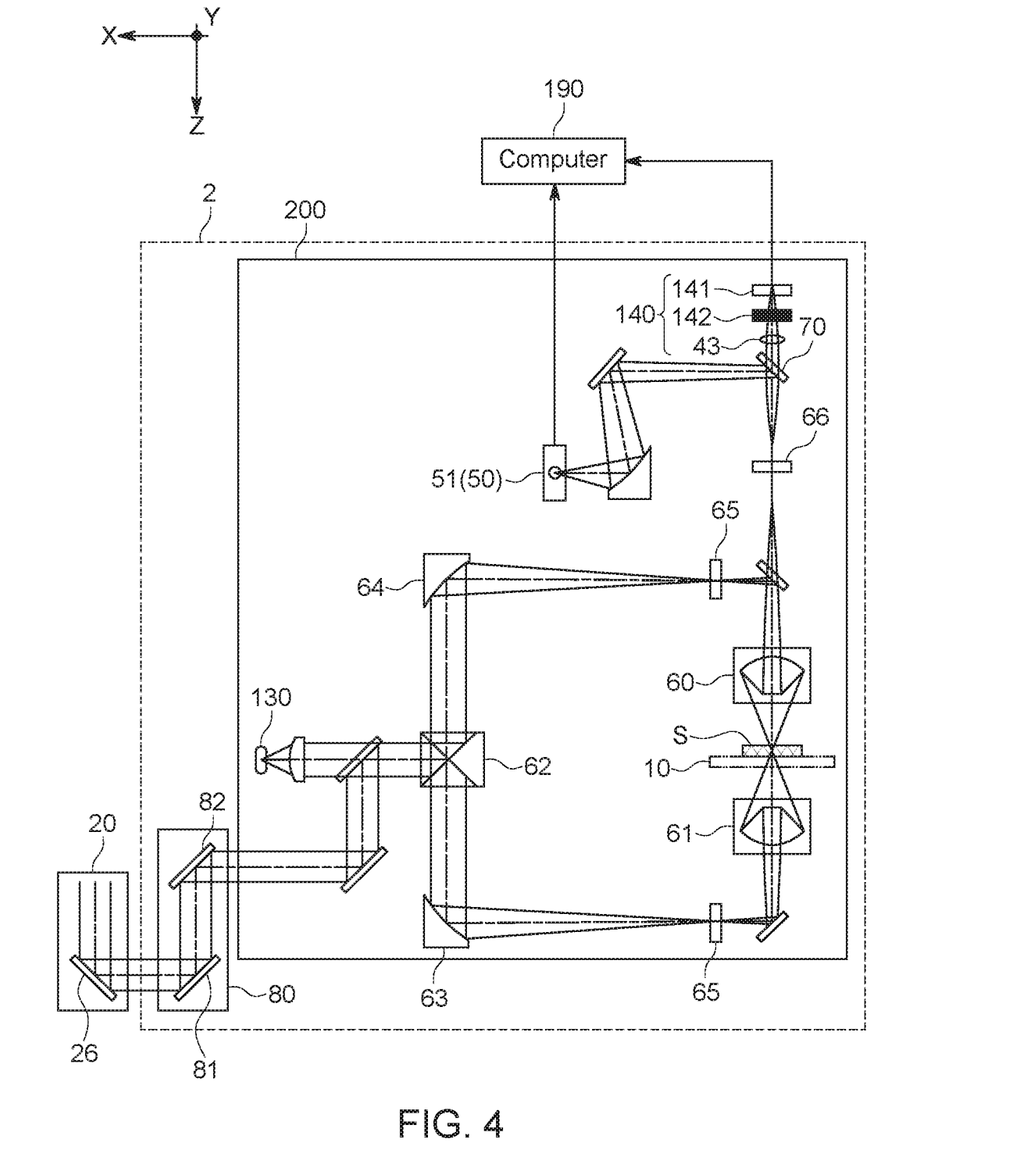
FIG. 4 illustrates the main components of a conventional infrared microscope system.

FIG. 4 is a drawing illustrating the main components of a conventional infrared microscope system. Here, one direction parallel to the ground is defined as the X direction, the direction parallel to the ground and perpendicular to the X direction is defined as the Y direction, and the direction perpendicular to the X direction and Y direction is defined as the Z direction.

The infrared microscope system comprises an infrared microscope 2 having an infrared microscope main body 200 and a connection optical system 80; an FTIR 20; and a computer 190 which performs control of the whole infrared microscope system.

The infrared microscope main body 200 comprises a sample stage 10 on which a sample S is placed; a visible light source unit 130 which outputs visible light; an image acquisition device 140 having a detection surface which detects visible light; a detection unit 50 which detects infrared light; cassegrain mirrors 60, 61; a transmission/reflection switching mirror 62; parabolic mirrors 63, 64; and a beam splitter 70.

While illustration of the details of the sample stage 10 has been omitted, it comprises a sample platform which is a mobile member, an X direction drive mechanism, a Y direction drive mechanism, and a Z direction drive mechanism.

A sample S can be placed onto and removed from the top surface of the sample platform. Such a sample platform can be moved in the desired X direction, Y direction and Z direction based on the necessary drive signals being outputted to the drive mechanisms by the computer 190.

The visible light source unit 130 is a halogen lamp which outputs illumination light including visible and near-infrared light of 400 nm to 1000 nm. The visible light source unit 130 is configured such that, after the optical path has been selected and switched between transmission measurement and reflection measurement by the transmission/reflection switching mirror 62, the outputted illumination light is converged by means of cassegrain mirror 60 (during reflection measurement) or cassegrain mirror 61 (during transmission measurement), and parabolic mirror 63 (during transmission measurement) or parabolic mirror 64 (during reflection measurement), and is irradiated onto a region including the analysis position on the surface of the sample S which has been placed onto the sample stage 10.

The image acquisition unit 140 comprises a CMOS camera 141 having a detection surface; and an infrared cut filter 142 and imaging lens 43 arranged in front of the CMOS camera 141. By means of this, illumination light including visible and near-infrared light of 400 nm to 1000 nm from the region including the analysis position on the surface of the sample S is converged by the cassegrain mirror 60 and advances in a predetermined direction (−Z direction), and visible light of 400 nm to 680 nm is then detected on the detection surface of the CMOS camera 141.

The detection unit 50 comprises an infrared detector (MCT) 51. By means of this, the infrared light beam from the analysis position on the sample S is converged by cassegrain mirror 60, 61, advances in a predetermined direction (−Z direction), and is reflected in the X direction by beam splitter 70 and is then detected by infrared detector 51.

The connection optical system 80 comprises a first plane mirror 81 for bending the infrared light beam from FTIR 20 by substantially 90°; a second plane mirror 82 for bending the infrared light beam from the first plane mirror 81 by substantially 90°; a screw adjustment mechanism (not illustrated) which adjusts the pitch angle of the first plane mirror 81; and a screw adjustment mechanism (not illustrated) which adjusts the yaw angle of the first plane mirror 81.

Figure 5:
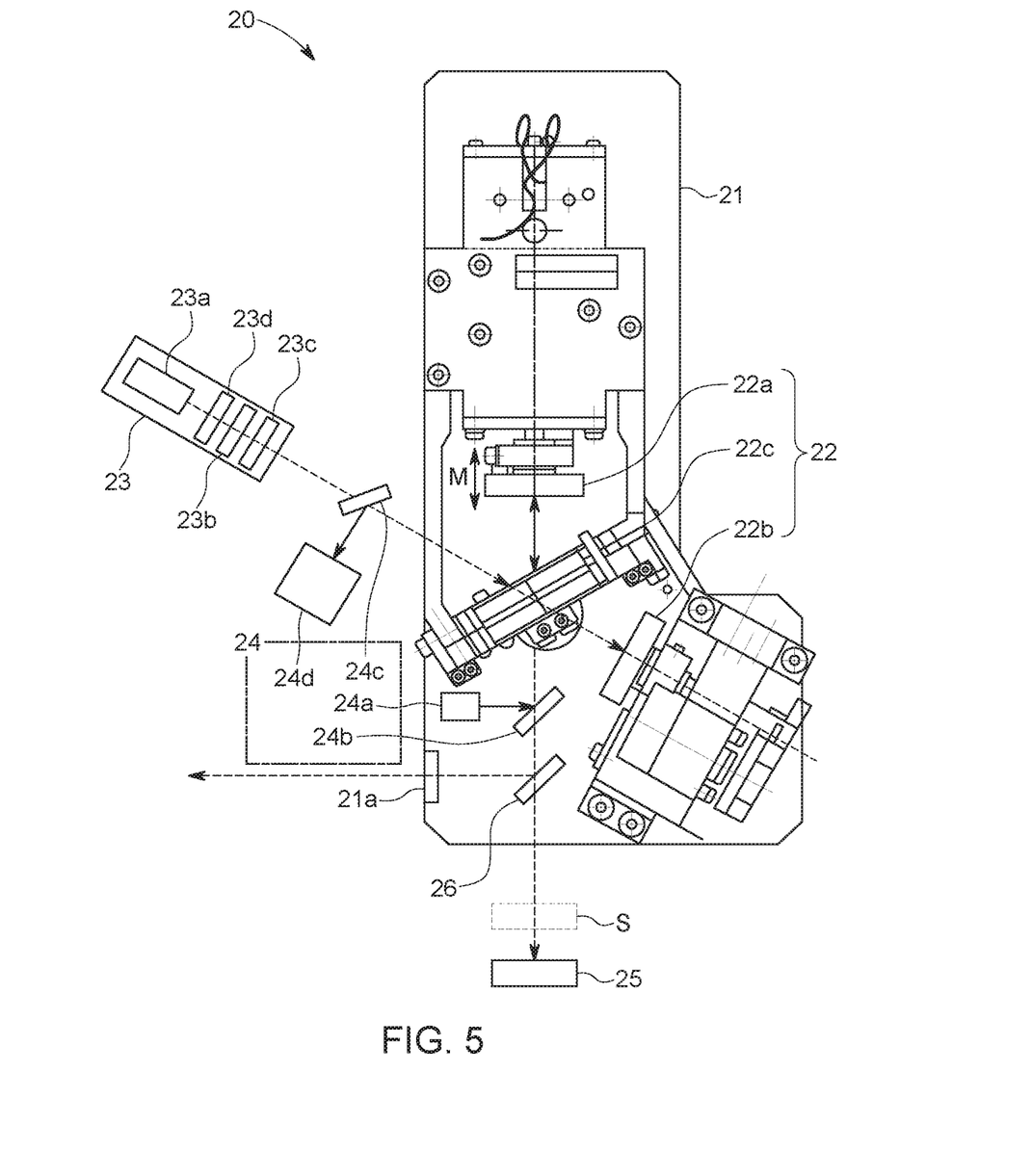
FIG. 5 illustrates the main components of an FTIR.

Here, the main components of FTIR 20 will be described using FIG. 5. FTIR 20 comprises a case 21 having a light beam extraction window (outlet) 21a, a Michelson interferometer 22, an infrared light source unit 23 which outputs an infrared light beam, a mobile mirror speed information detection unit 24, a detector 25, and a switching mirror 26 for switching the optical path to either the detector 25 or the light beam extraction window 21a.

The Michelson interferometer 22 comprises a mobile mirror unit having a mobile mirror 22a, a stationary mirror unit having a stationary mirror 22b, and a beam splitter 22 arranged between the mobile mirror 22a and stationary mirror 22b.

With a Michelson interferometer 22 of this sort, the infrared light beam outputted from the infrared light source unit 23 is irradiated onto the beam splitter 22c and is split by the beam splitter 22c into two directions, toward the mobile mirror 22a and stationary mirror 22b. The infrared light beam reflected by the mobile mirror 22a and the infrared light beam reflected by the stationary mirror 22b return to the beam splitter 22c and are combined and sent to the light beam extraction window 21a and detector 25. Here, the mobile mirror 22a moves forward and back in reciprocating fashion in the incident optical axis direction M, so the optical path length of the two split light beams changes periodically, and the light which heads from the beam splitter 22c toward the light beam extraction window 21a and detector 25 forms an interferogram whereof the amplitude fluctuates with time.

The infrared light source unit 23 comprises an infrared light source 23a which outputs an infrared light beam, a Jacquinot stop 23b capable of selecting and switching between circular apertures of different diameter, a parabolic mirror 23c, and a converging mirror 23d. By means of this, the infrared light beam outputted from the infrared light source 23a is irradiated via Jacquinot stop 23b and parabolic mirror 23c onto the beam splitter 22c of Michelson interferometer 22. It will be noted that the Jacquinot stop 23b has the function of determining the spectral resolution of FTIR 20, with the resolution increasing as the circular aperture is made smaller, enabling analysis of gaseous samples and the like requiring high spectral resolution.

Subsequently, the infrared light beam outputted from the light beam extraction window 21a passes through the connection optical system 80, and after the optical path has been selected and switched between transmission measurement and reflection measurement by the transmission/reflection switching mirror 62 of the infrared microscope main body 200, the infrared light beam is converged by cassegrain mirror 60 or cassegrain mirror 61 and parabolic mirror 63 or parabolic mirror 64 and is irradiated onto the analysis position (for example, 15 μm×15 μm) on the sample S which has been placed onto the sample stage 10.

Furthermore, the FTIR 20 is provided with a mobile mirror speed information detection unit 24 for detecting mobile mirror speed information. The mobile mirror speed information detection unit 24 performs speed information detection using a red laser light (632.8 nm), and comprises a He—Ne laser light source unit 24a which outputs red laser light, half-mirror 24b and half-mirror 24c which reflect red laser light, and laser light detector 24d (for example, see patent document 2).

With such a mobile mirror speed information detection unit 24, the red laser light outputted from the He—Ne laser light source unit 24a passes through half-mirror 24b and is irradiated onto beam splitter 22c, and is split in two directions toward mobile mirror 22a and stationary mirror 22b by the beam splitter 22c. The red laser light reflected by the mobile mirror 22a and the red laser light reflected by the stationary mirror 22b then return to the beam splitter 22c and are combined. Here as well, the mobile mirror 22a is similarly moving in reciprocating fashion back and forth in the incident optical axis direction M, so the difference in optical path length of the two split light beams changes periodically, and the light heading from the beam splitter 22c toward the laser light detector 24b constitutes laser interference light whereof the amplitude fluctuates with time. The position, movement speed, etc. of the mobile mirror 22a is computed on the basis of the detection signal of the laser light detector 24d, i.e., based on a laser light interference fringe signal. Here, the laser interference light is sent to the light beam extraction window 21a and detector 25 as return light from the beam splitter 22c.

In an infrared microscope system of this sort, there is a need to perform an adjustment operation to properly align the optical axis of the infrared light beam from the FTIR 20 with the optical axis of the optical system of the infrared microscope main body 200.

Here, this adjustment operation will be described. First, the operator (analyst, etc.) installs the connection optical system 80 between FTIR 20 and infrared microscope main body 200. Next, the operator causes red laser light to be outputted from the He—Ne laser light source unit 24a of FTIR 20. Next, the operator performs rough adjustment of the angle of the first plane mirror 81 using as a guide the red laser light which has entered Michelson interferometer 22 from the He—Ne laser light source unit 24a and has returned from the beam splitter 22c. Here, graph paper or the like to serve as a laser target is placed over the second plane mirror 82 to which the red laser light is guided from the first plat mirror 81, and rough adjustment is performed using the screw adjustment mechanism while visually checking the position of the red laser light on the target. Next, the operator causes an infrared light beam to be outputted from the infrared light source unit 23 of FTIR 20. Next, while looking at the infrared spectrum based on the output signal from the infrared detector 51, the operator performs fine adjustment of the angle of the first plane mirror 81 using the screw adjustment mechanism such that infrared power is maximized (see FIG. 3).

PRIOR ART DOCUMENTS

Patent Documents (Patent document 1) Japanese Unexamined Patent Application Publication 2000-121554
(Patent document 2) Japanese Unexamined Patent Application Publication 2009-139352

SUMMARY OF THE INVENTION

Problem to be Solved by the Invention

However, with an adjustment operation as described above, it would take a very long time for the operator to perform the rough adjustment using the screw adjustment mechanism while visually checking the red laser light position on the target to where the infrared spectrum can be confirmed.

Furthermore, even after rough adjustment had been performed using the screw adjustment mechanism, a suitable position for confirming the infrared spectrum would sometimes not be achieved. In such cases, over ten minutes to several tens of minutes would be required for readjustment while searching a wide adjustment margin range in order to increase the infrared spectrum intensity. Moreover, in cases where infrared power does not increase, and a suitable position cannot be found, the process would have to be repeated multiple times.

It will be noted that when misalignment occurs between the optical axis of the infrared light beam from the FTIR 20 and the optical axis of the optical system of the infrared microscope main body 200, the distribution of infrared power detection of the reflection mode relative to the transmission mode of the infrared microscope 2 deviates greatly from the design value, and it becomes impossible to achieve full performance of options using low light quantity where the entrance pupil for the infrared light beam is small, such as GAO and ATR used in reflection mode.

Means for Solving the Problem

The present inventor investigated adjustment operations that would allow the optical axis of the infrared light beam from the FTIR 20 to be easily aligned with the optical axis of the optical system of the infrared microscope main body 200.

The He—Ne laser light source unit 24a is installed so as to be offset by a slight angle (for example, 0.5°) from the optical axis of the optical system of the Michelson interferometer 22 so that the return red laser light from the Michelson interferometer 22 does not enter into the output window of the laser tube (He—Ne laser light source unit 24a). This is in order to prevent the laser generation from becoming unstable when red laser light returns to the laser tube and affecting the control of the Michelson interferometer 22. Thus, the red laser light outputted from the He—Ne laser light source unit 24a enters the Michelson interferometer 22, is reflected by the mobile mirror 22a and stationary mirror 22b and returns, and since the distance from the beam splitter 22c to the second plane mirror 82 is long, it was found that the amount of offset between the optical axis of the red laser light and the optical axis of the infrared light beam becomes overly large.

Figure 3:
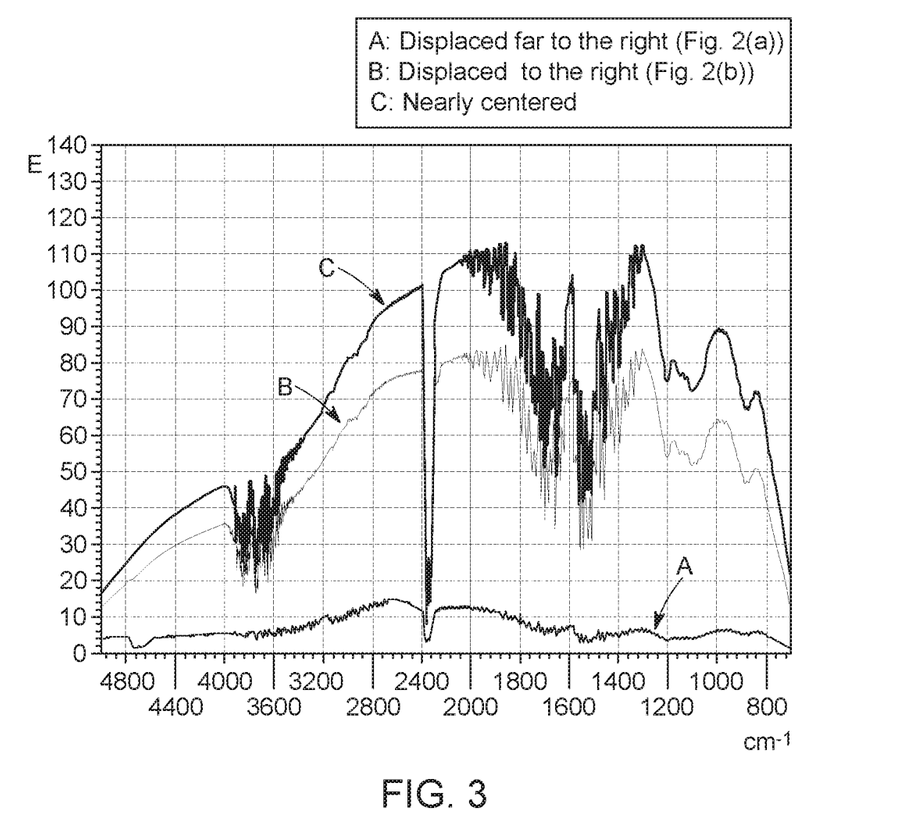
FIG. 3 illustrates an example of the infrared spectrum acquired from the detection unit.

Furthermore, after adjusting the angle of the first plane mirror 81 using the red laser light with a large amount of offset as a guide, when fine adjustment of the angle of the first plane mirror 81 is performed while looking at the infrared spectrum, if biases or areas locally stronger than the surroundings (local subsidiary maxima) are present in the cross-sectional intensity distribution of the infrared light beam, fine adjustment of the angle of the first plane mirror 81 would sometimes be inadvertently performed such that a local maximum occurs away from the optical axis of the infrared light beam (see the spectra marked A and B in FIG. 3). Namely, it was found that once a locally high position is found, that position may be misidentified as the maximum position of infrared power because moving the first plane mirror 81 in any direction from there would cause the infrared power to decrease.

Thus, it was decided to use the infrared light beam from the infrared light source unit 23 itself, rather than red laser light from the He—Ne laser light source unit 24a, as the guide. Furthermore, since the infrared light beam cannot be seen with the naked eye, it was decided to use an image acquisition unit capable of detecting an infrared light beam. For example, in an infrared microscope main body 200 as described above, the infrared cut filter 142 arranged in front of the CMOS camera 141 was removed and at the same time, a high sensitivity CMOS camera capable of detecting light of 400 nm to 1000 nm was employed.

Figure 6:
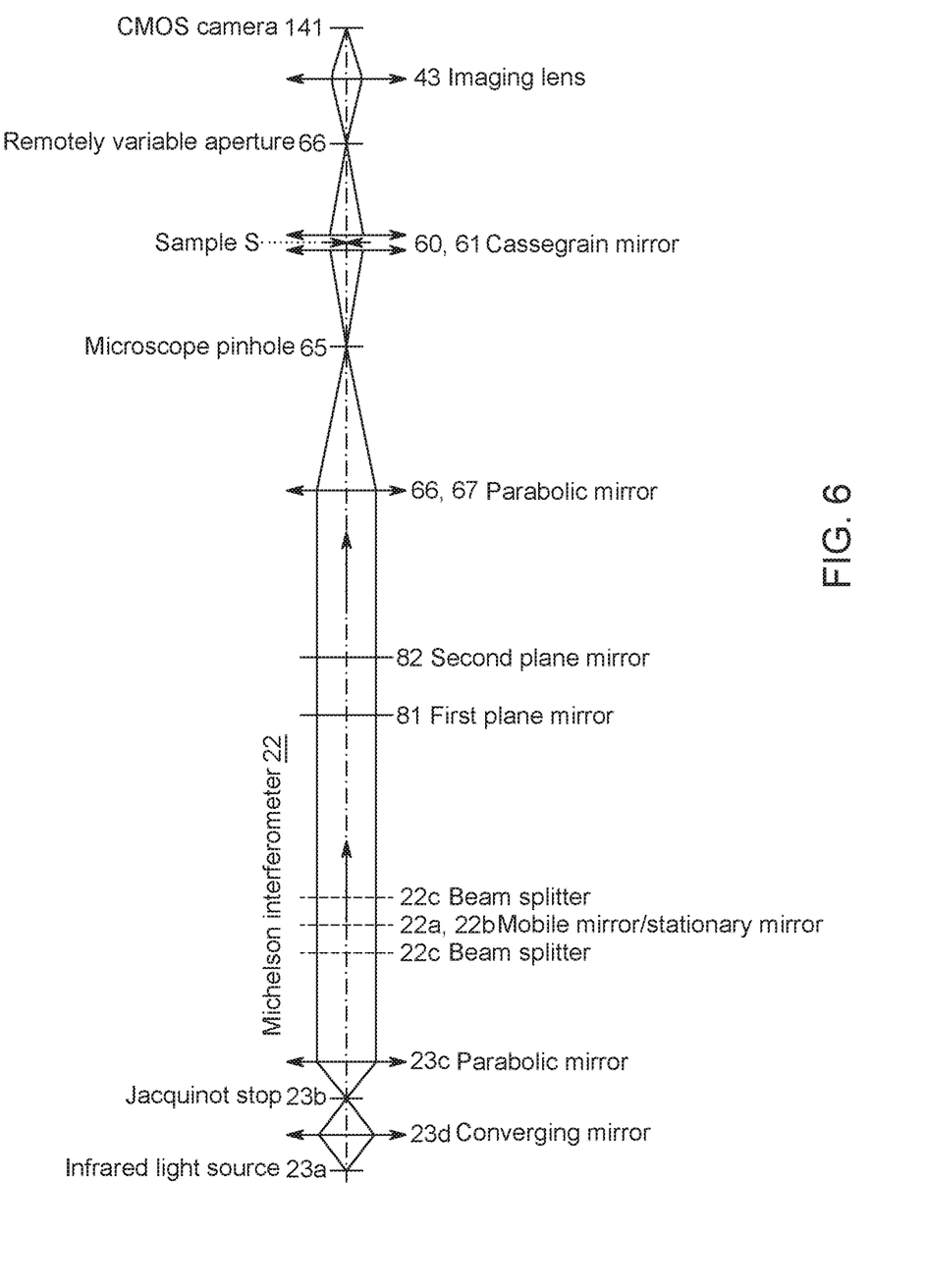
FIG. 6 is an optical path diagram from the infrared light source unit of the FTIR to the CMOS camera.

Here, FIG. 6 is an optical path diagram (not to scale) from the infrared light source unit 23 of FTIR 20 to CMOS camera 14. It should be noted that, in order to simplify the illustration, only a schematic drawing is show, omitting representation of bent plane mirrors and infrared measurement systems which are unnecessary for the explanation.

The six conjugate positions of (1) infrared light source 23a, (2) Jacquinot stop 23b, (3) microscope pinhole 65 (determined by the optical tube length), (4) sample surface, (5) remote variable aperture 66 (determines the infrared measurement region on the sample S surface) and (6) CMOS camera 141 are arranged ideally on the optical axis, and if the centering and focus adjustment are in a suitable state, the image of (1) through (6) is formed in overlapping fashion on the detection surface of the CMOS camera 141, and at the same time, the center of the image of (1) through (6) comes to be in a state where it matches the center of the view field of the image of the CMOS camera 141. It will be noted that for (1) and (2) on the FTIR 20 side, the optical axis adjustment is completed during manufacturing of the FTIR 20, and for the four locations (3) through (6), the optical axis adjustment is completed during manufacture of the infrared microscope 2.

Figure 2:
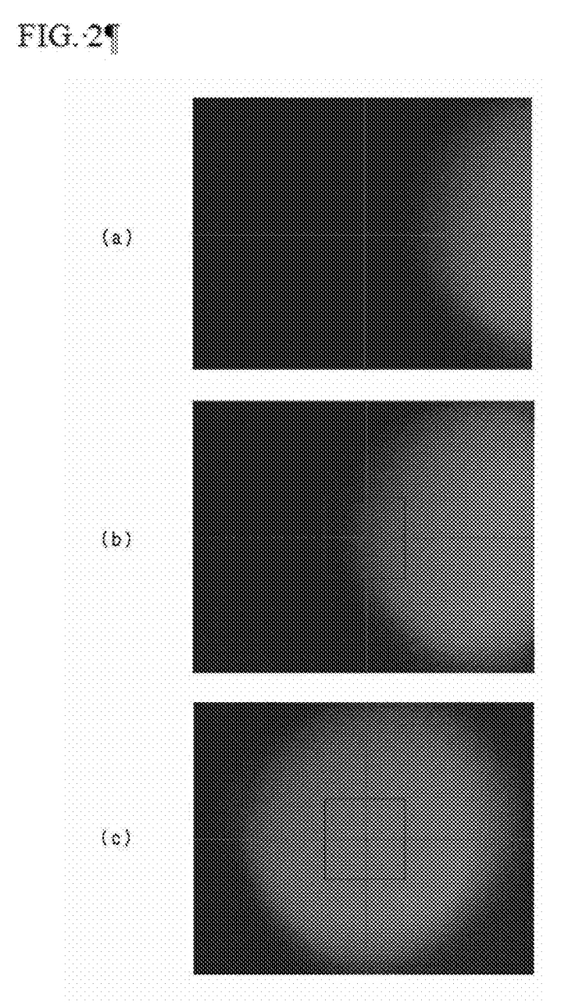
FIG. 2 illustrates an example of the infrared light image acquired from the image acquisition device.

Thus, it was discovered how to perform adjustment of the optical axis of the infrared light and the optical axis of the optical system of the infrared microscope main body 200 while making the infrared light, which cannot be seen with the naked eye, visible by means of a CMOS camera 141 built into the infrared microscope main body 200 (see FIG. 2 at (a) through (c)).

Namely, the infrared microscope of the present invention is an infrared microscope comprising: an illumination optical system which guides infrared red to an analysis position on a sample; a connection optical system which guides infrared light, supplied from an infrared spectrophotometer, to said illumination optical system; a visible light source unit which outputs visible light to a region including said analysis position on the sample; an image acquisition unit which inputs visible light from the region including said analysis position on the sample to a detection surface and acquires a visible light image; and a detection unit which detects infrared light from said analysis position on the sample, wherein said connection optical system can be positionally adjusted, and said image acquisition unit is capable of acquiring an infrared light image by inputting infrared light to a detection surface.

Effect of the Invention

With the infrared microscope of the present invention, the position of the connection optical system can be adjusted while looking at an infrared light image, so the ease of operation clearly increases and the operation for suitably aligning the optical axis of the infrared light from the infrared spectrophotometer and the optical axis of the optical system of the infrared microscope can be performed in a very short time (2 to 3 minutes). Furthermore, the amount of offset relative to the center of view field of the infrared light image and the infrared light becomes measurable, so the instrument error after the adjustment operation can be kept small by quantitatively setting the acceptability criterion during the adjustment operation. Moreover, since the adjustment results can be left behind as an infrared light image, for example, if there is a reduction in infrared power due to change over time, this can be made use of as a troubleshooting technique, such as by comparing the stored infrared light image with the current infrared light image to investigate if the cause of the infrared power reduction is optical axis misalignment.

Means for Solving Other Problems and Effect

Furthermore, in the infrared microscope of the present invention, said connection optical system may comprise a first plane mirror, a second plane mirror, and an adjustment mechanism which rotationally moves said first plane mirror.

Furthermore, in the infrared microscope system of the present invention, said visible light source unit may be a white LED.

With the infrared microscope of the present invention, by using a white LED, even if the infrared cut filter is removed, there will be no radiation of near-infrared light, and problems of the visible light image during normal analysis being colored red can be prevented.

Furthermore, the infrared microscope system of the present invention may comprise: an infrared microscope as described above; an infrared spectrophotometer; and a control unit which controls said infrared microscope and said infrared spectrophotometer.

Furthermore, in the infrared microscope system of the present invention, said infrared spectrophotometer may comprise an infrared light source which outputs infrared light, and a Jacquinot stop arranged in front of said infrared light source.

With the infrared microscope system of the present invention, during adjustment operation, by inserting circular aperture of an unused Jacquinot stop into the optical path, the center of the circular aperture image which moves in accordance with change in angle of the connection optical system, can be visually checked while aligning to the view field center of the infrared light image, thereby allowing the optical axis of the infrared light from the infrared spectrophotometer and the optical axis of the optical system of the infrared microscope to be adjusted accurately in a short time.

Moreover, in the infrared microscope system of the present invention, said control unit may control said connection optical system based on said infrared light image.

DETAILED DESCRIPTION OF THE INVENTION

An embodiment of the present invention will be described below using the drawings. It will be noted that the present invention is not limited to the embodiment described below and includes various other embodiments that do not depart from the gist of the present invention.

Figure 1:
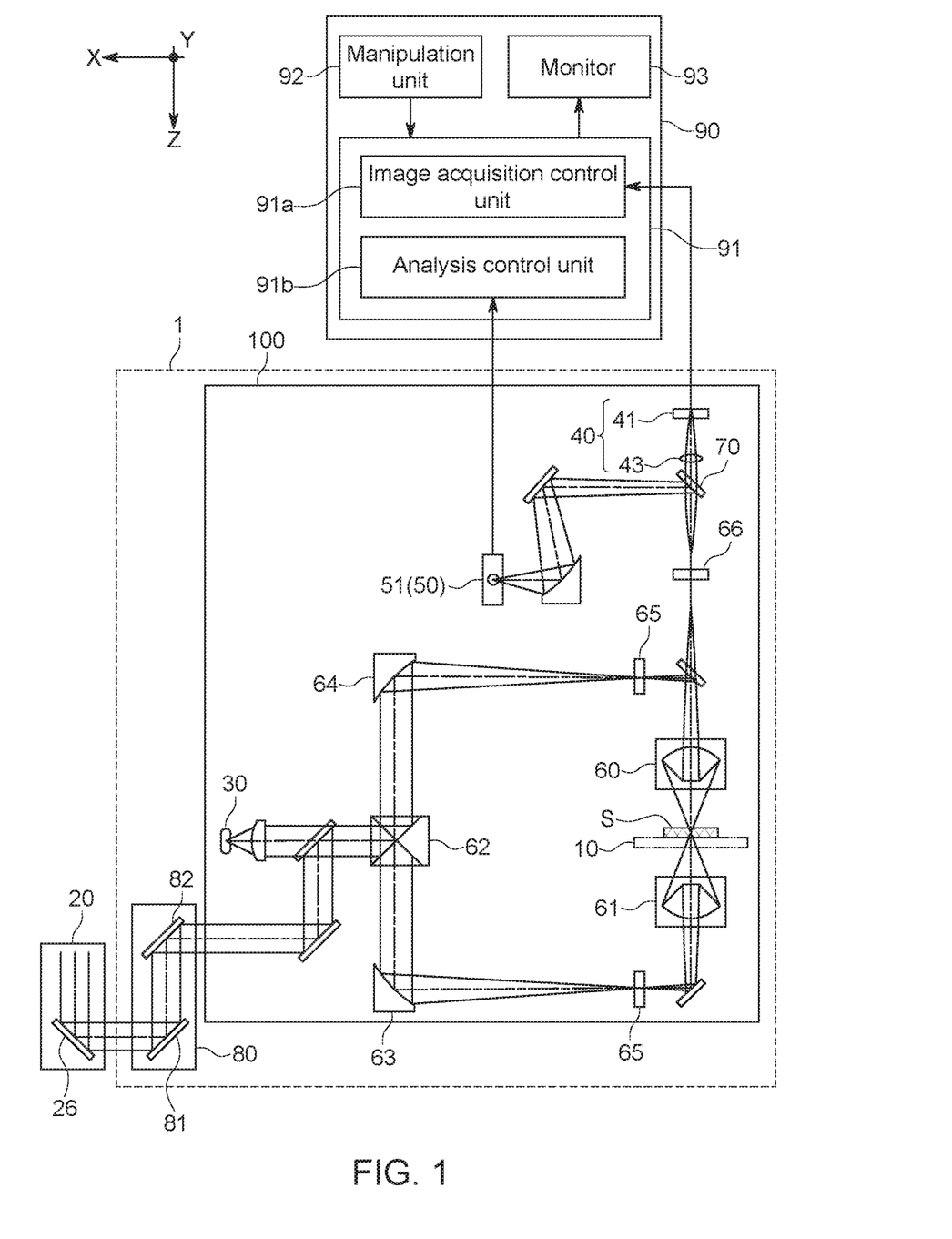
FIG. 1 illustrates the main components of an infrared microscope system according to the present invention.

FIG. 1 is a drawing illustrating the main components of the infrared microscope system of the present invention. It will be noted that components which are the same as the in the conventional infrared microscope system discussed above will be assigned the same reference symbols and description thereof will be omitted.

The infrared microscope system comprises an infrared microscope 1 having an infrared microscope main body 100 and a connection optical system 80, an FTIR 20, and a computer 90 which performs control of the whole infrared microscope system.

The infrared microscope main body 100 comprises a sample stage on which a sample S is placed, a visible light source unit 30 which outputs visible light, an image acquisition device 40 which has a detection surface that detects visible light, a detection unit 50 which detects infrared light, cassegrain mirrors 60, 61, a transmission/reflection switching mirror 62, parabolic mirrors 63, 64, and a beam splitter 70.

The visible light source unit 30 is a white LED which outputs visible light of 400 nm to 700 nm. The visible light source unit 30 is configured such that, after the optical path has been selected and switched between transmission measurement and reflection measurement by the transmission/reflection switching mirror 62, the outputted visible light is converged by means of cassegrain mirror 60 or cassegrain mirror 61, and parabolic mirror 63 or parabolic mirror 64, and is irradiated onto a region including the analysis position on the surface of the sample S which has been placed onto the sample stage 10.

The image acquisition unit 40 comprises a CMOS camera 11 having a detection surface; and an infrared cut filter 142 and imaging lens 43 arranged in front of the CMOS camera 141. By means of this, illumination light including visible and near-infrared light of 400 nm to 1000 nm from the region including the analysis position on the surface of the sample S is converged by the cassegrain mirror 60 and advances in a predetermined direction (−Z direction), and visible light of 400 nm to 680 nm is then detected on the detection surface of the CMOS camera 141.

The computer 90 comprises a CPU (control unit) 91 and memory (not illustrated), and also has a manipulation unit 92 and monitor 93 connected to it. Furthermore, to describe the functions processed by the CPU 91 in terms of blocks, these comprises an image acquisition control unit 91a which acquires images from image acquisition device 40 and displays them on the monitor 93, and an analysis control unit 91b which acquires infrared light information from the detection unit 50, performs a Fourier transform thereon to compute the infrared spectrum, and displays it on the monitor 93.

Here, FIG. 2 is a drawing illustrating an example of the infrared light image acquired from the image acquisition device 40, where an image of the circular aperture of the Jacquinot stop 23b is displayed in the middle of an infrared light image. Furthermore, FIG. 2 at (a) shows the state where the circular aperture image is displaced to the right of the infrared light image, FIG. 2 at (b) shows the state where adjustment has been performed so that the circular aperture image moves slightly closer to the center of the infrared light image, and FIG. 2 at (c) shows the state where the circular aperture image has been adjusted to be substantially in the center of the infrared light image.

It will be noted that the magnification rate of the infrared light image corresponds to the magnification rate of cassegrain mirror 60 and is interlocked with magnification rate change of cassegrain mirror 60. Moreover, the diameter of the circular aperture image in the infrared light image corresponds to the diameter of the circular aperture of the Jacquinot stop 23b, and is interlocked with changes in diameter of the circular aperture.

Thus, it is preferable to make the diameter of the circular aperture image about the same as or smaller than vertical direction of the infrared light image, and during the adjustment operation, by performing adjustment while switching from a large circular aperture to a small circular aperture, the center of the optical axis of the infrared light beam becomes easier to find.

Here, the diameter of the circular aperture image formed on the sample surface is computed based on formula (1) below.

Diameter of circular aperture image on sample S surface=circular aperture diameter×(focal distance of parabolic mirror 63 or 64)/(focal distance of parabolic mirror 23c)/(cassegrain mirror 60 magnification rate) (1)

Therefore, for example, in the case of a 400 μm×300 μm infrared light image, the diameter of the circular aperture of the Jacquinot stop 23b is set to 1 mm, the focal distance of the parabolic mirror 63 or parabolic mirror 64 is set to 275 mm, the focal distance of the parabolic mirror 23c is set to 60 mm, and the magnification rate of cassegrain mirror is set to 15, so that the diameter of the circular aperture image of the Jacquinot stop 23b on the sample surface becomes 300 μm.

FIG. 3 is a drawing illustrating an example of the infrared spectrum acquired from the detection unit 50, showing infrared spectra corresponding to the states of FIG. 2 (a) through (c). In the state of FIG. 2 (a) and FIG. 2 (b), there is a possibility that the maximum infrared power position will be misidentified, but in the state of FIG. 2 (c), the infrared power increases and the possibility of misidentifying the maximum infrared power position is eliminated.

Image acquisition control unit 91a performs control to display the image from the image acquisition device 40 on the monitor 93 based on an input signal from manipulation unit 92.

For example, to designate an infrared light beam irradiation position on the sample S or to designate the position of the analysis range on the sample S, the operator inputs "normal measurement mode" using the manipulation unit 92. As a result, the image acquisition control unit 91a ignites the white LED, sets the parameters of "normal measurement mode", in which the exposure time of the CMOS camera 4 is set to a predetermined time and the sensitivity (analog in, digital in) is set to a predetermined value. A visible light image is furthermore acquired from the image acquisition device 40 and displayed on the monitor 93. Based on this, the operator designates the infrared light beam irradiation position on the sample S by performing mouse drags, scroll bar manipulations, etc. using the manipulation unit 92 on the visible light image.

On the other hand, when performing an adjustment operation for aligning the optical axis of the infrared light beam from the FTIR 20 and the optical axis of the optical system of the infrared microscope main body 100, the operator inputs "maintenance mode" using the manipulation unit 92. Based on this, the image acquisition control unit 91a sets the parameters of "maintenance mode", in which the exposure time of CMOS camera 41 is made longer (the shutter speed is made slower) and the sensitivity (analog in, digital in) is increased, since the energy of near-infrared light is lower than that of visible light. The infrared light image is then acquired from the image acquisition device 40 and displayed on the monitor 93 (see FIG. 2 at (a) through (c)).

Here, the adjustment operation for aligning the optical axis of the infrared light beam from the FTIR 20 and the optical axis of the optical system of the infrared microscope main body 100 using the infrared microscope system of the present invention will be described.

First, the operator installs the connection optical system 80 between the FTIR 20 and the infrared microscope main body 100. Next, the operator causes red laser light to be outputted from the He—Ne laser light source unit 24a of FTIR 20. Next, the operator performs rough adjustment of the angle of the first plane mirror 81 using as a guide the red laser light returning from the He—Ne laser light source unit 24a. Here, graph paper or the like to serve as a laser target is placed over the second plane mirror 82 to which the red laser light is guided from the first plat mirror 81, and rough adjustment is performed using the screw adjustment mechanism while visually checking the position of the red laser light on the target.

Next, the operator inputs "maintenance mode" using the manipulation unit 92. Based on this, the image acquisition control unit 91a sets the parameters of "maintenance mode", in which the exposure time of the CMOS camera 41 is lengthened and the sensitivity (analog in, digital in) is increased. The infrared light image is then acquired from the image acquisition device 40 and displayed on the monitor 93.

Next, the operator inserts the Jacquinot stop 23b having a circular aperture of a predetermined diameter (for example, 1 mm) into the optical path, and causes an infrared light beam to be outputted from the infrared light source unit 23 of FTIR 20. Next, while looking at the infrared light image displayed on the monitor 93, the operator adjusts the angle of the first plane mirror 81 using the screw adjustment mechanism so that the circular aperture image comes to be in state where it has been adjusted substantially to the center of the infrared light image.

Next, while looking at the infrared spectrum (see the spectrum with reference symbol C in FIG. 3) which has been computed by the analysis control unit 91b based on the output signal (infrared light information) from the infrared detector 51, the operator performs fine adjustment of the angle of the first plane mirror 81 using the screw adjustment mechanism so that the infrared power becomes maximum. Finally, the operator saves the infrared light image after fine adjustment to memory for use as comparison data for troubleshooting.

With the infrared microscope system of the present invention as described above, the angle of the first plane mirror can be adjusted while looking at the infrared light image, so the ease of operation clearly improves, and the operation for suitably aligning the optical axis of the infrared light from the FTIR 20 and the optical axis of the optical system of the infrared microscope main body 100 can be performed in a very short time. Furthermore, since the adjustment results can be left behind as an infrared light image, for example, if there is a reduction in infrared power due to change over time, this can be made use of as a troubleshooting technique, such as by comparing the stored infrared light image with the current infrared light image to investigate if the cause of the infrared power reduction is optical axis misalignment.

Other Modes of Embodiment

<1> The infrared microscope system according to the present invention as described above was configured such that the operator, while looking at the infrared light image displayed on the monitor 93, adjusts the angle of the first plane mirror 81 using a screw adjustment mechanism such that the circular aperture image comes to be in a state where it has been adjusted to be substantially in the center of the infrared light image, but a configuration may also be employed wherein the image acquisition control unit 91a automatically adjusts the angle of the first plane mirror 81 using a screw adjustment mechanism such that the circular aperture image comes to be in a state where it has been adjusted to be substantially in the center of the infrared light image, Specifically, a linear stepping motor (for example, made by Nippon Pulse Motor Co., Ltd.) is incorporated into screw adjustment mechanisms for pitch and yaw. A target value at which the circular aperture image aligns with the center of the infrared light image is stored in advance, brightness information for the lateral cross-section and longitudinal cross-section of the central part of the infrared light image is read at the time of adjustment, and the pulse count and feed direction of the linear stepping motor are computed based on deviation from the target value to perform automatic control.

<2> The infrared microscope system according to the present invention as described above may be configured such that the acceptability criterion for the adjustment operation is set quantitatively using the infrared light image.

<3> The infrared microscope system according to the present invention as described above was configured such that light is converged by parabolic mirror 63 or parabolic mirror 64 after the optical path has been selected and switched between transmission measurement and reflection measurement by the transmission/reflection switching mirror 62, which is a plane mirror, but instead of this, a configuration may be employed wherein selection and switching between transmission measurement and reflection measured as well convergence of light are performed by means of a transmission/reflection switching mirror which is a parabolic mirror.

INDUSTRIAL APPLICABILITY

The present invention can be favorably used for infrared microscopes, etc. which are used in combination with an infrared spectrophotometer.

DESCRIPTION OF REFERENCE SYMBOLS

1 Infrared microscope
10 Sample stage
20 FTIR (infrared spectrophotometer)
30 Visible light source unit
40 Image acquisition device (image acquisition unit)
50 Detection unit
61 Cassegrain mirror (illumination optical system)
80 Connection optical system
91 CPU (control unit)

What is claimed is:

1. An infrared microscope system, comprising:
   an infrared microscope comprising:
      an illumination optical system which guides infrared light to an analysis position on a sample;
      a connection optical system which guides infrared light, supplied from an infrared spectrophotometer, to said illumination optical system;
      a visible light source unit which outputs visible light to a region including said analysis position on the sample;
      an image acquisition unit which inputs visible light from the region including said analysis position on the sample to a detection surface and acquires a visible light image; and
      a detection unit which detects infrared light from said analysis position on the sample; and
   the infrared spectrophotometer, wherein
   said connection optical system is configured to be positionally adjusted, and
   said image acquisition unit is configured to acquire an infrared light image by inputting infrared light to a detection surface.

2. The infrared microscope system as set forth in claim 1, wherein said connection optical system comprises a first plane mirror, a second plane mirror, and an adjustment mechanism which rotationally moves said first plane mirror.

3. The infrared microscope system as set forth in claim 1, wherein said visible light source unit is a white LED.

4. The infrared microscope system as set forth in claim 1, wherein said infrared spectrophotometer comprises an infrared light source which outputs infrared light, and a Jacquinot stop arranged in front of said infrared light source.

5. The infrared microscope system as set forth in claim 1, further comprising a control unit which controls said infrared microscope and said infrared spectrophotometer, wherein said control unit controls said connection optical system based on said infrared light image.

6. The infrared microscope system as set forth in claim 4, wherein said infrared light image, that said image acquisition unit is configured to acquire, includes an image of an aperture of said Jacquinot stop.

7. The infrared microscope system as set forth in claim 1, wherein said image acquisition unit is configured to acquire an infrared light image by inputting infrared light to a detection surface of a camera of said image acquisition unit.

* * * * *